United States Patent [19]

Saito

[11] Patent Number: 5,062,010
[45] Date of Patent: Oct. 29, 1991

[54] ELECTRONIC STILL CAMERA WITH REMOTELY-CONTROLLED AUDIO RECORDING FEATURE

[75] Inventor: Etsuro Saito, Kanagawa, Japan

[73] Assignee: Sony Corporation, Tokyo, Japan

[21] Appl. No.: 440,472

[22] Filed: Nov. 21, 1989

Related U.S. Application Data

[63] Continuation of Ser. No. 270,454, Nov. 7, 1988, abandoned, which is a continuation of Ser. No. 800,330, Nov. 21, 1985, abandoned.

[30] Foreign Application Priority Data

Dec. 27, 1984 [JP] Japan .................. 59-281626

[51] Int. Cl.⁵ .................................... H04N 5/781
[52] U.S. Cl. ........................... 360/35.1; 358/341; 358/906; 358/909
[58] Field of Search ........... 360/8, 9.1, 19.1, 32, 360/33.1, 35.1; 358/335, 906, 909, 341, 343

[56] References Cited

U.S. PATENT DOCUMENTS

| | | | |
|---|---|---|---|
| 4,131,919 | 12/1978 | Lloyd et al. | 360/35.1 X |
| 4,420,773 | 12/1983 | Toyoda et al. | 360/35.1 X |
| 4,450,487 | 5/1984 | Koide | 358/335 |
| 4,456,931 | 6/1984 | Toyoda et al. | 358/335 |
| 4,492,989 | 1/1985 | Watanabe et al. | 360/32 |
| 4,531,161 | 7/1985 | Murakoshi | 360/35.1 X |
| 4,541,016 | 9/1985 | Ochi et al. | 358/228 |
| 4,549,229 | 10/1985 | Nakano et al. | 360/19.1 X |
| 4,567,535 | 1/1986 | Kinjo | 360/35.1 X |
| 4,570,188 | 2/1986 | Ichiyanagi | 360/35.1 X |
| 4,584,598 | 4/1986 | Kutaragi | 358/29 |

FOREIGN PATENT DOCUMENTS

58-108882 6/1983 Japan .
2112603 7/1983 United Kingdom .

Primary Examiner—Roy N. Envall, Jr.
Assistant Examiner—W. R. Young
Attorney, Agent, or Firm—Ronald P. Kananen

[57] ABSTRACT

An electronic still camera has a video recording feature and, in addition, an audio recording feature. The electronic still camera can control video recording timing and audio recording timing in accordance with the user's desires. The electronic still camera is also provided with a remote control system which can control video recording timing and audio recording timing in a mutually variable timing relationship. The electronic still camera has a video recording system and an audio recording system built into the camera, a data recording system including a recording medium for receiving video data from the video recording system and audio data from the audio recording system for recording and reproduction, and a remote control system associated with the video recording system and audio recording system for operating the video recording system and audio recording system. The remote control system can be used to adjust the video recording timing and audio recording timing relative to each other. Preferably, the remote control system includes manually operable device for operating the video recording system and the audio recording system at different timings. More preferably, the manually operable device has a remote controller which includes a independent video recording and audio recording switches.

21 Claims, 5 Drawing Sheets

ELECTRONIC STILL CAMERA WITH REMOTELY-CONTROLLED AUDIO RECORDING FEATURE

This is a continuation of co-pending application Ser. No. 07/270,454 filed on Nov. 7, 1988, which is a continuation of Ser. No. 06/800,330, filed on Nov. 21, 1985 (abandoned).

BACKGROUND OF THE INVENTION

The present invention relates generally to a solid-state still image recording apparatus for picking up and recording still images, which apparatus is also capable of recording audio signals. More specifically, the invention relates to control of the solid-state still image recording apparatus with audio recording feature, for controlling recording of still images and of audio signals at a given timing.

Recently, electronic or solid-state cameras for picking up still images have been developed and put into the market. Such electronic cameras employ magnetic media or the like as a replacement for photographic film in recording still images. Hereafter, the word "video recording" will be used to represent picking-up and recording still images on magnetic or equivalent recording media.

In order to make such solid-state still camera more attractive, it has been proposed to add audio recording features to the camera. In such cameras, it is possible to record audio sound related to the video recording, which is hereafter referred to as "audio recording", for a given period of time, e.g. 10 sec. Specifically, such cameras allow audio recording at a certain timing relative to the timing of video recording. The ability to record not only still images but also audio sound, such as voice, would make these cameras more attractive.

However, in cameras with both video and audio recording capability, it is difficult to properly set audio recording timing relative to video recording timing. This is inconvenient to the user since on different occasions, the user may want to perform video recording and audio recording at different times. Therefore, it would be beneficial to provide some flexibility in selecting the timing relationship between video recording and audio recording so that the user can use this type of camera more conveniently.

On the other hand, the camera can be equipped with a self-timing feature for performing video recording and audio recording in a manner similar to that of conventional film-type cameras. In this case, the timing relationship between video recording and audio recording becomes more critical. As is well known, such self-timers are generally used when the user of the camera wants to take his or her own picture. In such case, the user has to run to a predetermined position toward which the camera is directed after setting the self-timer. If the audio recording timing is set to start recording in response to onset of the self-timer, the user's voice will not be recorded until the user has run into the directional reception range of a microphone built into the camera. On the other hand, if the audio recording timing is set for a certain delay after onset of the self-timer, the above problem is avoided, but the selection of an appropriate delay time is very difficult, since the timing would be different for each individual user.

SUMMARY OF THE INVENTION

Therefore, it is a principle object of the invention to provide an electronic still camera with an audio recording feature which can control video recording timing and audio recording timing in accordance with the user's desires.

Another, object of the invention is to provide a remote control system for the electronic still camera which can control video recording timing and audio recording timing in a mutually variable timing relationship.

A further object of the invention is to provide an electronic video recording and audio recording camera which can control video recording timing and audio recording timing independently.

In order to accomplish the aforementioned and other objects, an electronic still camera, according to the invention, comprises a video recording system and an audio recording system built into the camera, a data recording system including a recording medium for receiving video data from the video recording system and audio data from the audio recording system for recording and reproduction, and a remote control system associated with the video recording system and audio recording system for operating the video recording system and audio recording system. The remote control system can be used to adjust the video recording timing and audio recording timing relative to each other.

In the preferred construction, the remote control system includes manually operable means for operating the video recording system and the audio recording system at different timings. More preferably, the manually operable means comprises a remote controller including independent video recording and audio recording switches.

In accordance with one aspect of the invention, an electronic still camera with an audio recording feature comprises an image pick-up means for picking up video data, an audio recording means for receiving audio data, a magnetic disk drive mechanism including a magnetic disk for storing the video data and the audio data, and a remote controller for remotely controlling the image pick-up means to pick up video data and the audio recording means and to record audio data at a given timing.

The remote controller operates the image pick-up means and the audio recording means at mutually independent timings. The remote controller is operable in an AUTO mode in which the operation timings of the image pick-up means and the audio recording means are determined according to a preset timing, and in a MANUAL mode in which the operation timings of the image pick-up means and the audio recording means are controlled independently of each other.

According to another aspect of the invention, a combination of an image pick-up apparatus and an audio recording apparatus, comprises the image pick-up apparatus adapted to pick-up video data for a still image, the audio recording apparatus receiving audible sound and recording corresponding audio data, a medium adapted to store the video data and audio data, a recording and reproduction apparatus associated with the medium for recording video and audio data on the medium and reproducing the recorded video and audio data, a manually operable remote controller for producing a remote control signal including a first component representative of an image pick-up demand and a second component representative of an audio recording demand, first means associated with the image pick-up apparatus and responsive to the first component of the remote control signal for ordering the image pick-up apparatus to pick up video data, and second means associated with the audio recording apparatus and responsive to the second component of the remote control signal for ordering the audio recording apparatus to record audio data.

The remote controller comprises a first switch means for producing the remote control signal containing the first component when actuated, and a second switch means for producing the remote control signal containing the second component when actuated.

The first and second switch means are manually operable at mutually independent times. One of the first and second switch means is manually operable and the other of the first and second switch means is automatically operable at a preset time after manual operation of the one of the first and second switch means. The preset time is variable.

The remote controller comprises a timing setting means allowing manual adjustment of the preset time.

The image pick-up apparatus includes a first memory for temporarily storing the video data and transferring the data to the recording and reproduction apparatus for recording the video data on the medium at a first transfer timing, and the audio recording apparatus includes a second memory for temporarily storing the audio data and transferring the audio data to the recording and reproduction apparatus for recording the audio data on the medium at a second transfer timing. The image pick-up apparatus includes a shutter and the first memory comprises photo-sensitive elements, and the shutter becomes operative in response to the first component of the remote control signal for controlling exposure of the first memory, thereby causing the first memory to pick up and store video data.

On the other hand, the audio recording apparatus includes a microphone for receiving audible sound, means for converting the output of the microphone into a PCM signal and the second memory comprising a digital memory, and the second memory being responsive to the second component of the remote control signal for recording the PCM signal for a predetermined period of time.

The medium comprises a magnetic disk and the recording and reproduction apparatus comprises a disk drive accommodating the magnetic disk, the disk drive including an electric motor for driving the magnetic disk to rotate, which electric motor is driven in response to the first component of the remote control signal prior to operation of the shutter. The shutter is operated to expose the first memory after a given delay time after the first component of the remote control signal, which delay time is long enough to allow the electric motor to attain a proper operating speed after starting to rotate. The first and second means is responsive to termination of exposure of the first memory by the shutter to record the video and audio data on the magnetic disk. The second means is disabled while the second memory is receiving the PCM signal. The second memory is adapted to record the PCM signal in the form of a compressed-time-base PCM signal. The first memory comprises a charge transfer device.

The remote controller comprises a radio control unit. In the preferred embodiment, the radio control unit is adapted to transmit infrared rays as the remote control signal.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
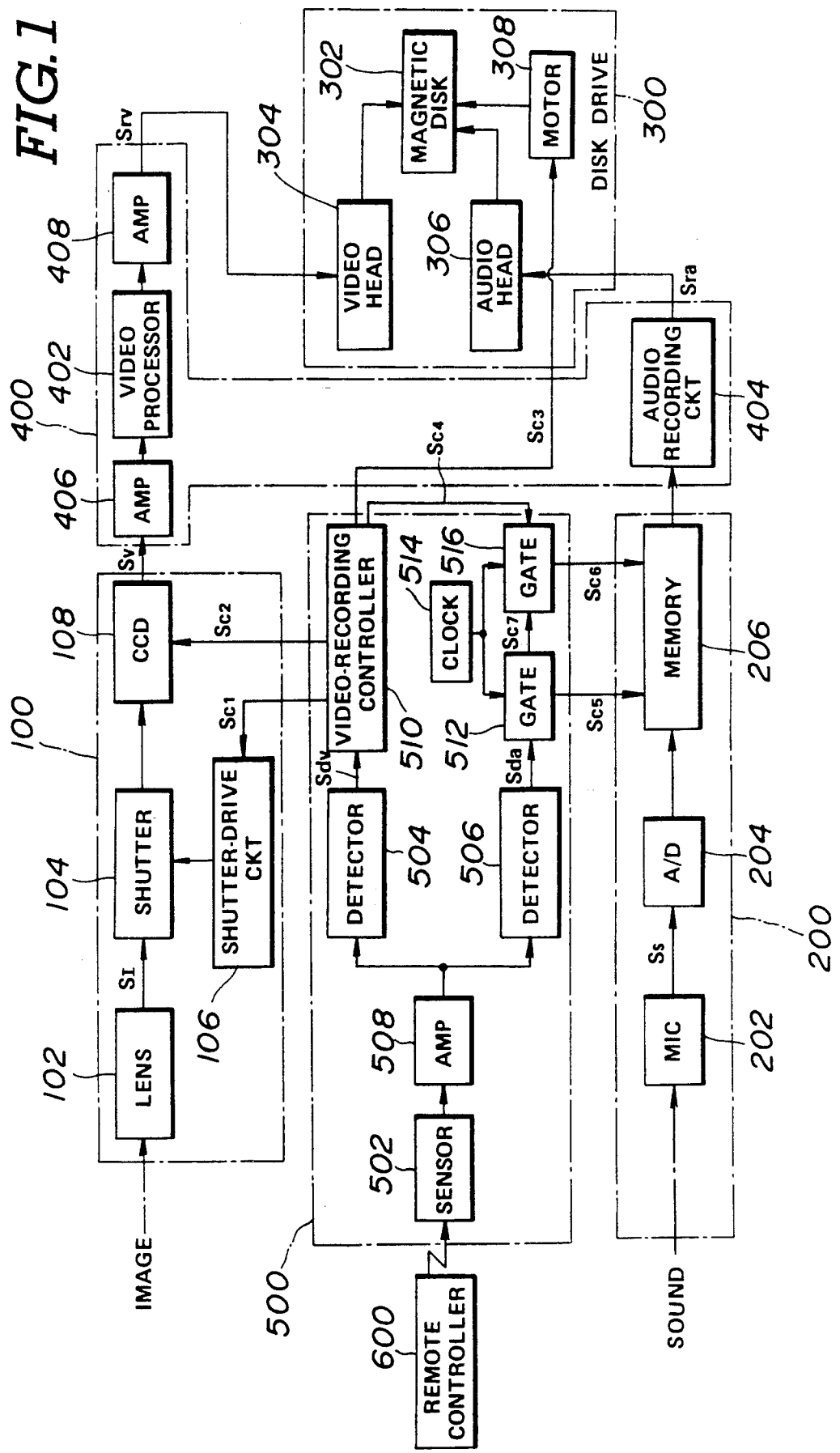
FIG. 1 is a block diagram of the preferred embodiment of a video and audio recording circuit according to the invention.
Figure 2:
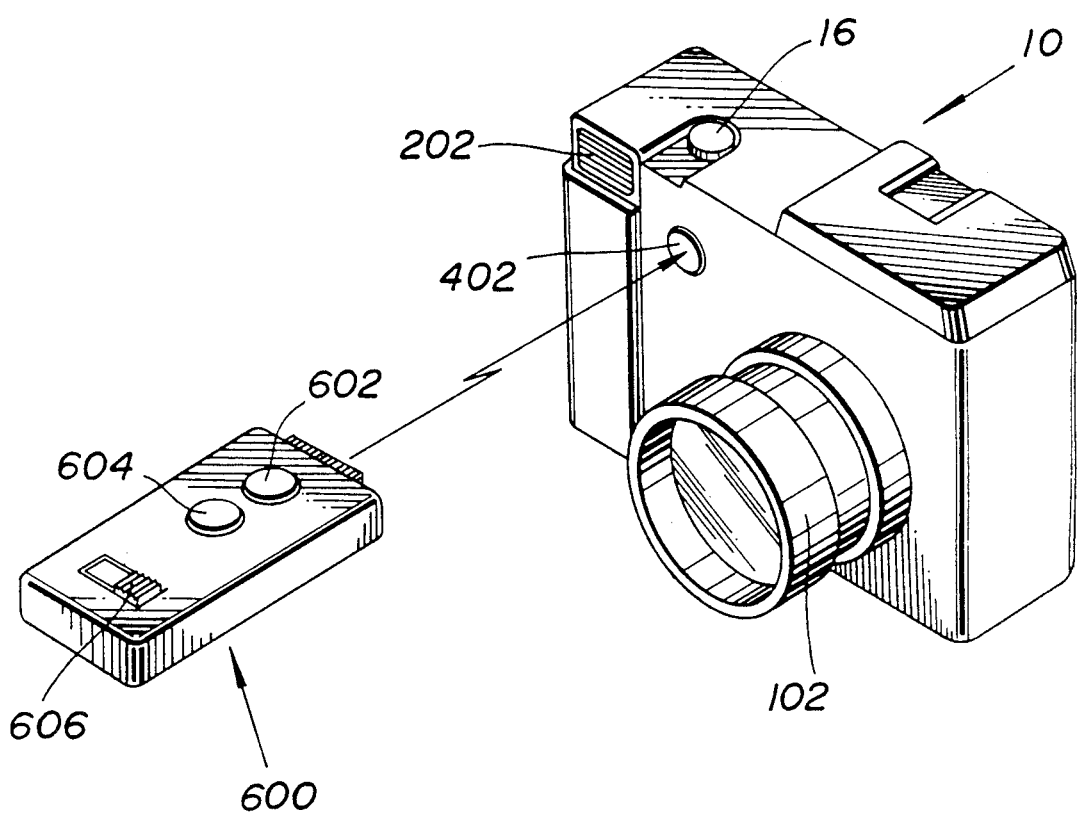
FIG. 2 is a perspective view of the preferred embodiment of a video and audio recording electronic still camera according to the invention.

Referring now to the drawings, particularly to FIGS. 1 and 2, the preferred embodiment of a still camera 10 has an image pick-up system 100 and an audio receiver system 200. The image pick-up system 100 includes a lens assembly 102 which focuses an image on an image receptacle comprising a charge transfer device, such as a charge-coupled device (CCD) 108, through a shutter mechanism 104. The shutter mechanism 104 controls exposure of the CCD 108 and therefore, is controlled by a shutter drive circuit 106 to be opened and closed. On the other hand, the audio receiving system 200 includes a microphone 202 and a memory 206. The memory 206 comprises a digital memory for receiving pulse-code-modulated (PCM) audio signals. In order to derive PCM signals from the output of the microphone 202, an analog-to-digital (A/D) converter 204 is interposed between the microphone and the memory.

The camera 10 also has a disk drive unit 300 with a magnetic disk 302 serving as a video and audio recording medium. The image received by the CCD 108 and the PCM audio signals written in the memory 206 are transferred to and stored on the magnetic disk 302 by means of a video head 304 and an audio head 306 respectively. A recording controller 400 controls transfer of the image data from CCD 108 and PCM signals from the memory 206. The recording controller 400 generally comprises a video processor 402 and an audio recording circuit 404. The video processor 402 is connected for input from CCD 108 via an amplifier 406 and is connected for output to the video head 304 via another amplifier 408.

It should be noted that a system for picking up an image and recording video data for the picked-up image on the magnetic disk, similar to the shown embodiment, has been disclosed in the British Patent First Publication No. 2,112,603A, published on July 20, 1983. The contents of this British Patent First Publication are hereby incorporated by reference for the sake of disclosure.

The video processor 402 and the audio recording circuit 404 cooperate in order to synchronize storage of video data and the PCM signals to the magnetic disk 302 in the disk drive.

The camera 10 also has a controller 500 for controlling operation of the image pick-up system 100, the audio receiving system 200, and the disk drive unit 300.

The controller 500 includes a remote control sensor 502 which receives remote control signals from a remote controller 600.

In the shown embodiment, the remote controller 600 transmits infrared rays which serve as the remote control signal. The infrared rays emitted by the remote controller 600 may be modulated to represent a video recording demand and/or an audio recording demand. Toward this end, the remote controller 600 may emit different frequencies or different amplitudes of infrared light for controlling video recording and audio recording independently.

The controller 500 has a pair of detectors 504 and 506 connected for input from the remote control sensor 502 via an amplifier 508. The detector 504 responds to the output of the remote control sensor 502 indicative of the video recording demand by outputting a detector signal to a video recording controller 510. The video recording controller 510 controls the shutter drive circuit 106 which controls exposure timing and duration. Also, the video recording controller 510 controls the read-out timing of the video data from CCD 108 and the operation of a disk drive motor 308 in the disk drive unit 300. The video recording controller 510 further controls read-out timing of PCM signals from the memory 206 of the audio receiving system 200.

Hereafter, the control signal output from the video recording controller 510 for controlling the shutter drive circuit 106 will be referred to as "shutter control signal $Sc_1$", that for controlling read-out timing of video data from the CCD will be referred to as "video data read-out control signal $Sc_2$", that for controlling the disk drive motor will be referred to as "disk drive control signal $Sc_3$", and that for controlling read-out timing of the PCM signals from memory 206 will be referred to as "PCM signal read-out control signal $Sc_4$".

The detector 506 responds to a sensor output indicative of an audio recording demand by outputting a detector signal to a gate 512. The gate 512 is connected to a clock generator 514 in order to receive a clock signal $S_t$. The gate 512 responds to the detector signal 506 by sending write-enable signal $Sc_5$ to the memory 206 in order to allow storage of audio data in the form of PCM signals for a predetermined period of time, e.g. 10 sec. The clock generator 514 also sends the clock signal to another gate 516. The gate 516 is connected to the video recording controller 510 to receive the PCM signal read-out control signal $Sc_4$, whereupon it sends a read-enable signal $Sc_6$ to the memory 206. In response to this read-enable signal $Sc_6$, the stored audio data is transmitted to the audio recording circuit 404.

Although it has not been illustrated in the drawings, the video recording controller 510 may be associated with a shutter release button 16 built into the camera 10 and serving as a shutter button. The video recording controller 510 may be responsive to depression of the shutter release button 16 to output the control signals $Sc_1$ to $Sc_4$ in substantially the same manner as when activated by the video recording controlling remote control signal from the remote controller. Furthermore, although not shown in the drawings, the camera may have an audio recording control button serving to trigger the gate 512 to enable storage of audio data for the predetermined period of time. Alternatively, the gate 512 can be triggered by depression of the shutter release button 12. In this case, the shutter control signal $Sc_1$ will be sent to the shutter drive circuit 106 after a given delay after issuance of the write-enable signal $Sc_5$. This delay time may be adjusted by means of a manually operable video-audio recording timing adjuster which may also be built into the camera 10.

As shown in FIG. 2, the remote controller 600 is provided with an audio recording control button 602 and a video recording control button 604. The remote controller 600 is also provided with a mode selector switch 606 for switching operation mode between a MANUAL mode and an AUTO mode. In MANUAL mode, the audio recording control button 602 and the video recording control button 604 can be operated independently of each other. Therefore, in the MANUAL mode, the audio recording timing and the video recording timing can be set as desired. On the other hand, in the AUTO mode, the audio recording control button 602 is disabled and only the video recording control button 604 is manually operable. In this case, audio recording timing and video recording timing are automatically controlled by providing a delay between the remote audio recording demand signal and the remote video recording demand signal. Preferably, an adjuster (not shown) in the remote controller 600 adjusts the delay between the output timing of the video recording demand infrared rays and the audio recording infrared rays.

It would also be advantageous to allow operation of the video recording button 604 while the audio recording button 602 is simultaneously depressed or alternatively within a given period of time after depression of the audio recording button 602. This ensures a good match between the audio sound and image upon reproduction. On the other hand, although the audio recording button 602 in the preferred embodiment set out above is disabled in AUTO mode, it would be possible to disable the video recording button and enable the audio recording button.

It should also be appreciated that, although not shown in the accompanying drawings, the camera 10 may be provided with a finder, a focusing mechanism associated with the lens assembly and/or an exposure control associated with the shutter mechanism, which are all well known in the field of film-type cameras.

Figure 4:
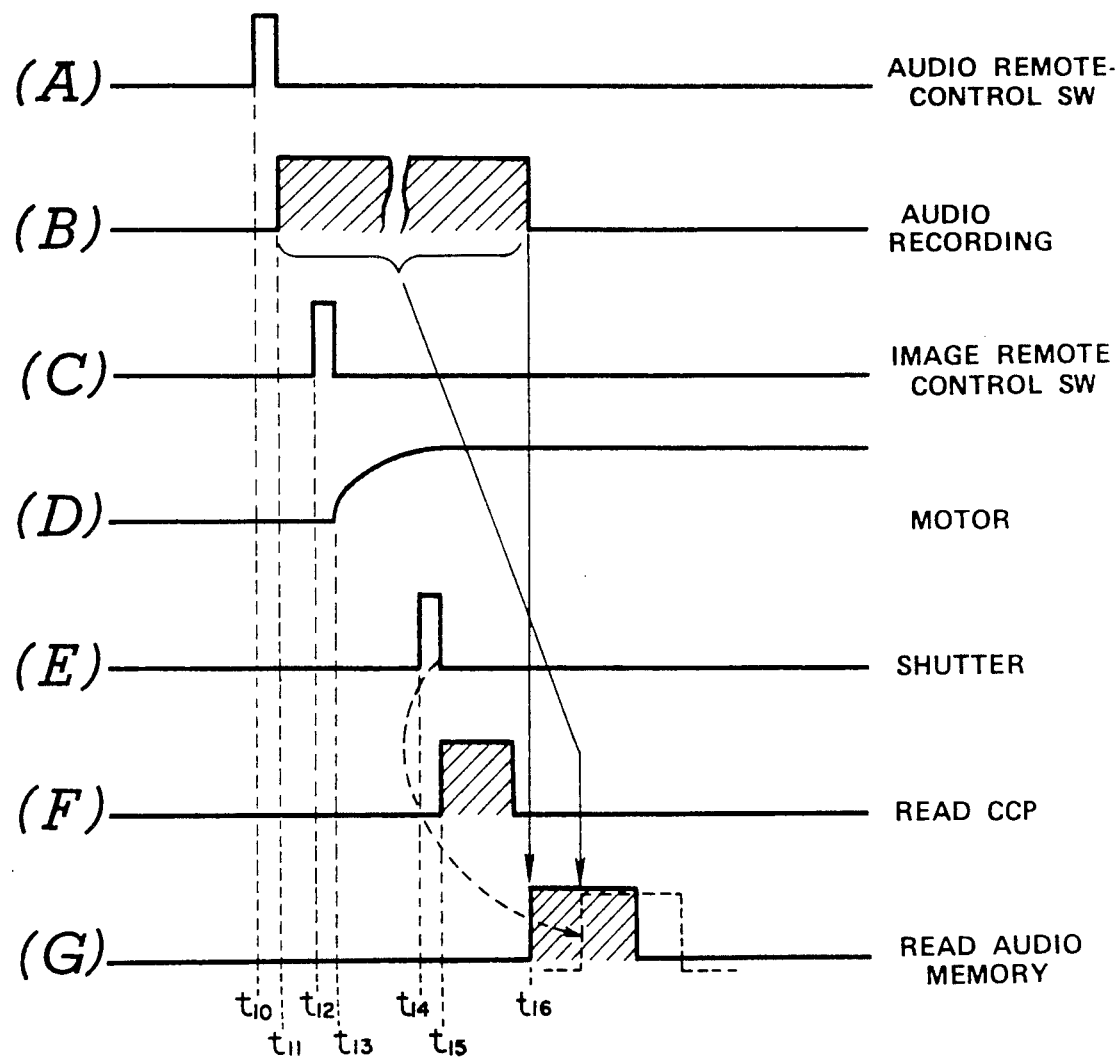
Figure 5:
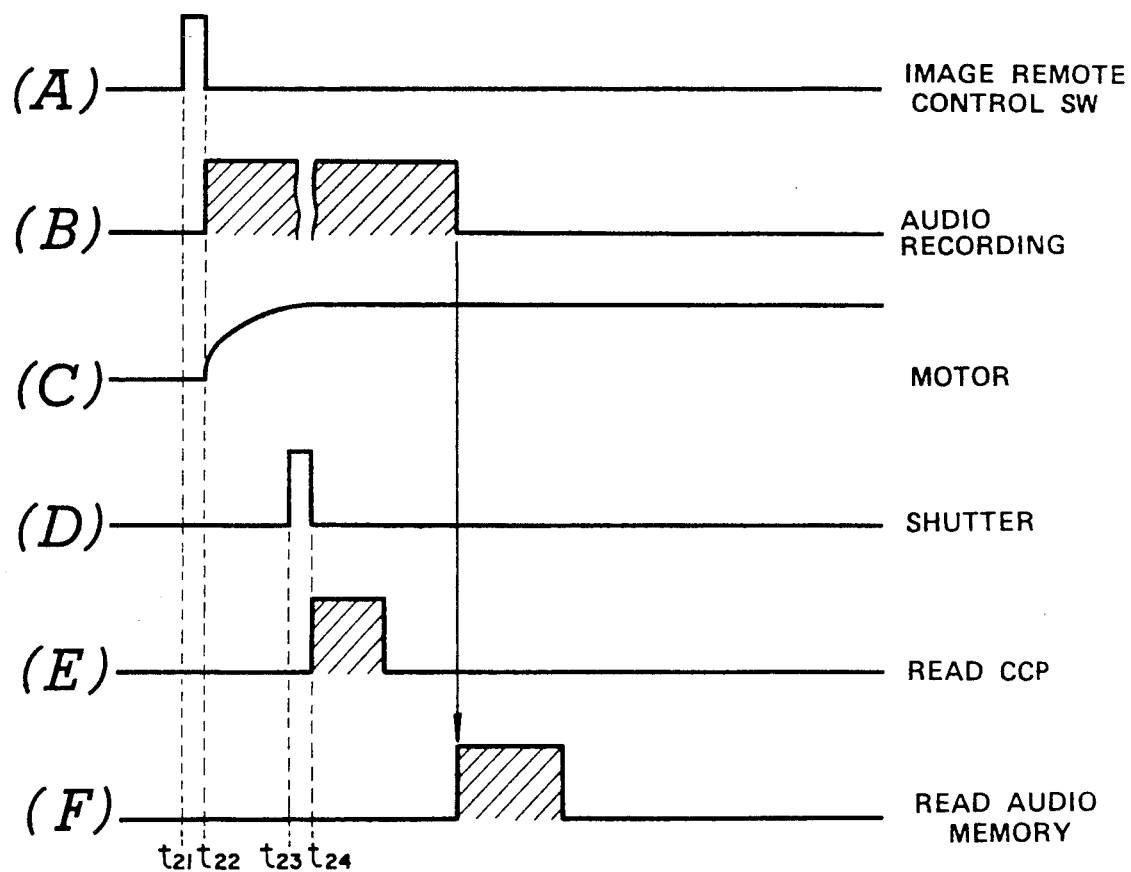

The operation of the aforementioned preferred embodiment of the still camera according to the present invention will be described in more detail with reference to FIGS. 3 to 5. It should be appreciated that FIGS. 3 to 5 show different timings of audio recording and video recording.

Figure 3:
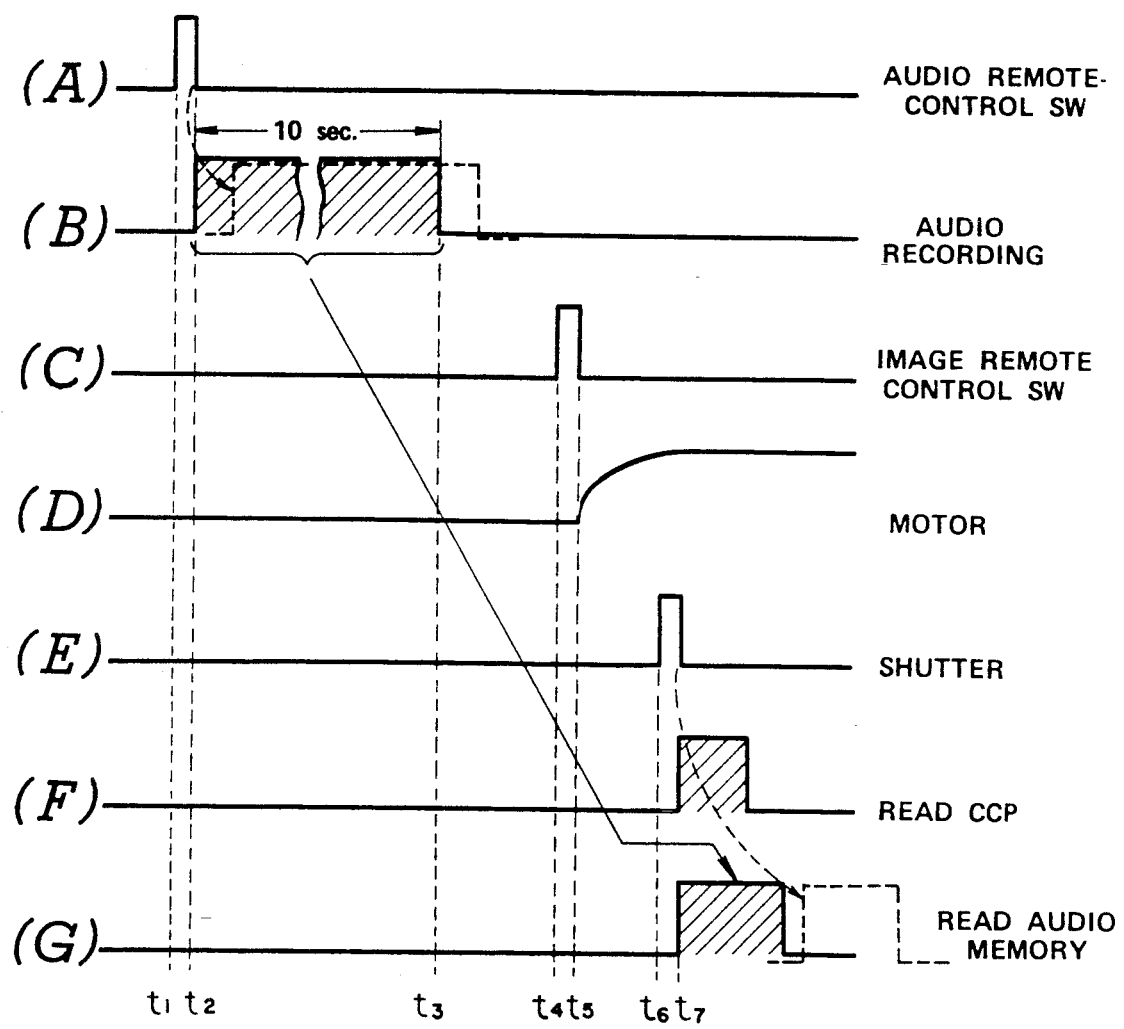
FIGS. 3(A-G), 4(A-G) and 5(A-F) are timing charts showing operation of the video and audio recording circuit of FIG. 1.

FIG. 3 shows audio recording and video recording in a case where the video recording control button is depressed after expiration of the audio recording period, which begins in response to depression of the audio recording control button 602. Specifically, at time $t_1$, the audio recording button 602 is depressed until time $t_2$, as shown in FIG. 3(A). Therefore, during the period between $t_1$ and $t_2$, infrared light representing an audio recording demand is transmitted by the remote controller 600. This audio recording demand signal is received by the remote control sensor 502. The sensor output indicative of the audio recording demand is detected by the detector 506. The detector 506 then outputs the detector signal $Sd_a$ to the gate 512. The gate 512 responds to the trailing edge or alternatively, the leading edge of the detector signal $Sd_a$ by sending the write-enable signal $Sc_5$ to the memory 206. At the same time, the gate 512 starts measuring elapsed time by counting the clock pulses from the clock generator 514. At time $t_3$ at which the predetermined audio recording period, e.g. 10 sec., expires, the gate 512 terminates the write-enabling signal Sc$_5$.

It should be appreciated that the write-enabling signal Sc$_5$ is sent to the memory in the form of clock pulse serving as a write clock pulse.

During the period t$_2$ to t$_3$, the memory 206 allows storage of the audio data. The audio data is received by the microphone 202 as an analog audio signal S$_s$. The audio signal S$_s$ is converted into PCM signals by the A/D converter 204 and input to the memory 206. Therefore, in the presence of the write-enabling signal Sc$_5$ in form of the write clock pulse, the PCM signals indicative of the audio data are stored in the memory 206 in a compressed time-base form.

It would be possible to provide a certain response delay of the gate 512 to the detector signal Sd$_a$ as shown by the broken line in FIG. 3(B). For this purpose, the gate 512 may be provided with a delay circuit responsive to each occurrence of the detector signal Sd$_a$. It would be preferable to allow adjustment of this delay by providing a delay time adjuster associated with the gate 512.

After completing storage of the audio data, the video recording control button 604 is depressed at a time t$_4$. The remote controller 600 transmits infrared rays representative of the video recording demand, as shown in FIG. 3(C). The detector 504 detects the video recording demands and outputs the detector signal Sd$_v$. The detector signal Sd$_v$ is sent to the video-recording controller 510. The video-recording controller 510 is responsive to the trailing edge of the detector signal Sd$_v$ to output the disk drive control signal Sc$_3$, at a time t$_5$. Then, the disk drive motor 308, which comprises a spindle motor, starts turning. After a predetermined period long enough to allow the motor of the disk drive motor 308 to come up to speed, the shutter control signal Sc$_1$ is output to the shutter drive circuit 106, at a time t$_6$. The shutter control signal Sc$_1$ remains HIGH for a period of time corresponding to the exposure duration of the shutter 104.

The exposure duration of the shutter may be derived manually or automatically according to the well known parameters. Therefore, the video-recording controller may derive the pulse width of the shutter control signal Sc$_1$ according to the optimum exposure period.

While the shutter control signal Sc$_1$ is HIGH, the shutter drive circuit 106 is active to hold the shutter 104 open and expose CCD to the image passing through the lens assembly 102. During this exposure period, CCD picks up one field or frame of image data. In response to the trailing edge of the shutter control signal Sc$_1$, the video data read control signal Sc$_2$ is transmitted to CCD 108 from the video-recording controller 510, at a time t$_7$. In response to the video data read control signal Sc$_2$, the temporarily stored image data in CCD 108 is read out and sent to the video processor 402 via the amplifier 406.

At the same time, i.e, at the time t$_7$, the audio data read control signal Sc$_4$ is output by the video-recording controller 510 to the gate 516. In response to the audio data control signal Sc$_4$, the gate sends the read-enable signal Sc$_6$ in the form of a read pulse to the memory 206. Therefore, the compressed audio data in the memory is read out and transmitted to the audio recording circuit 404.

The video processor 402 performs FM modulation of the video data signal and then sends the result to the video head 304 through the recording amplifier 408.

Likewise, the audio recording circuit 404 performs FM modulation of the audio data signal and then transmits it to the audio head 306. The video data and audio data are written onto the magnetic disk synchronously through the video head 304 and the audio head 306.

If desired, storage of audio and video data on the magnetic disk 302 may be non-synchronous, as shown by the broken line in FIG. 3(G). In this case, the gate 516 may delay transmission of the read-enable signal Sc$_6$ for a given delay time after receiving the audio data recording control signal Sc$_4$. This non-synchronous method of recording on magnetic disk enables video recording and audio recording by a common magnetic head. In order to enable video recording and audio recording with a common head, it is preferable to allow a certain interval, e.g. 1/60 sec., between video recording and audio recording.

FIGS. 4(A) to 4(G) are similar to FIGS. 3(A) to 3(G). However, in this case, the audio recording button 602 is depressed at a time labelled t$_{10}$ and the video recording button 604 is depressed during the audio recording period, e.g. within 10 sec. of depression of the audio recording button.

In this case, the audio recording demand signal is produced at the time t$_{10}$ and terminates at a time t$_{11}$. In response to the trailing edge of the detector signal Sd$_a$ from the detector 506, the write-enabling signal Sc$_5$ is transmitted from the gate 512 to the memory 206 to enable the latter to record the audio data received through the microphone 202 and converted into PCM signals by the A/D converter 204. After a while, the video recording demand signal is generated by the remote controller 600 in response to depression of the video recording button 604, at a time t$_{12}$. In response to this, the detector signal Sd$_v$ is output from the detector 504. In response to the trailing edge of the detector signal Sd$_v$, the disk drive control signal Sc$_3$ is sent at time t$_{13}$ to the disk drive spindle motor 308 to bring it up to speed. Once the disk drive is ready, i.e., at time t$_{14}$, the shutter control signal Sc$_1$ is transmitted to the shutter drive circuit 106 to operate the shutter mechanism 104.

In the shown example, the timing of depression of the video recording button 604 is sufficiently early to complete exposure of the CCD 108 before expiration of the audio recording period. Therefore, at a time t$_{15}$, i.e., at the end of the shutter control signal S$_1$, the video data read control signal Sc$_2$ is transmitted to the CCD. At the same time, the audio data read control signal Sc$_4$ is transmitted from the video recording controller 510 to the gate 516. At the same time, the gate 512 is still outputting the write-enabling signal Sc$_5$, and it also sends a disabling signal Sc$_7$ to the gate 516 (refer to FIG. 1). Therefore, despite the presence of the audio data read control signal, the audio data may not be read out of memory. At a time t$_{16}$, the write-enabling signal Sc$_5$, i.e., the audio recording period ends. At the same time, the disabling signal Sc$_7$ for the gate 516 ends. As a result, the gate 516 is free to transmit the read-enable signal Sc$_6$ to the memory 206. As a result, the audio data can be read from memory 206 after the time t$_{16}$. Thus, the video data and audio data are written to the magnetic disk 302 at different times.

As mentioned above, the remote controller 600 in the preferred embodiment of the invention allows not only MANUAL mode operation but also AUTO mode operation. FIG. 5 shows an example of AUTO mode operation.

The mode selector switch 606 is shifted to the AUTO mode position to select AUTO mode. As a result, the audio recording button 602 is disabled. The remote controller 600 becomes active in response to depression of the video recording button 604 at a time $t_{21}$. In this case, the remote controller 600 transmits the audio recording demand signal in response to depression of the video recording button. This initiates recording of audio data in memory 206 for the given period of time, e.g. 10 sec, starting at time $t_{22}$.

After a predetermined delay which may be manually adjustable as set forth above, the remote controller 600 transmits the video recording demand signal at a time $t_{23}$. In response to this, video data is picked up by CCD 108.

It should be appreciated that the predetermined delay time has to be longer than the time needed to bring the disk drive motor 308 up to speed. Therefore, the minimum delay time available to the manual adjusting means should be longer than the warm-up time of the disk drive motor.

The subsequent steps for transferring the audio and Video data to the magnetic disk 302 from the memory 206 and CCD 108 are essentially the same as disclosed with respect to FIG. 4.

As will be appreciated herefrom, the present invention fulfills all of the objects and advantages sought therefor.

It should be appreciated that, while the invention has been disclosed in terms of the specific embodiment, various embodiments and modifications to the shown embodiment would be possible without changing the significance of the invention.

For example, although the microphone is installed in the camera in the shown embodiment, it would be possible to use a wireless microphone installed in the remote controller or independent of the camera and the remote controller.

Therefore, the invention should be understood to include all possible embodiments and modifications to the shown embodiment which do not depart from the principle of the invention, which is set out in the appended claims.

What is claimed is:

1. An electronic still camera with an audio recording feature, comprising:
   an image pick up means for picking up one field of video data containing information of a still image to be recorded;
   an audio recording means for receiving audio data associated with said still image;
   a magnetic disk drive mechanism including a magnetic disk for storing said still image information containing video data and said audio data; and
   a remote controller means including a manually operable operating switch for remotely controlling said image pick up means and said audio recording means in a selected order and with a selected interval therebetween, which order and interval are predetermined prior to initiation of said operating switch;
   wherein said video data and said associated audio data are taken according to said predetermined order and interval controlled by said remote controller means, and subsequently recorded on said recording medium in a predetermined manner dependent upon said selected time interval and order.

2. The still camera as set forth in claim 1, wherein said remote controller means operates said image pickup means and said audio recording means at mutually independent timings.

3. An electronic still camera with an audio recording feature, comprising:
   an image pick up means for picking up one field of video data containing information of a still image to be recorded;
   an audio recording means for receiving audio data associated with said still image;
   a magnetic disk drive mechanism including a magnetic disk for storing said still image information containing video data and said audio data; and
   a remote controller means for remotely controlling said image pick up means and said audio recording means in a selected order and with a selected interval therebetween;
   wherein said video data and said associated audio data are taken according to said predetermined order and interval controlled by said remote controller means, and subsequently recorded on said recording medium in a predetermined manner dependent upon said selected time interval and order;
   wherein said remote controller means is operable in an AUTO mode in which the operation timings of said image pickup means and said audio recording means are determined according to a preset timing, and in a MANUAL mode in which the operation timings of said image pickup means and said audio recording means are controlled independently of each other.

4. The combination of an image pickup apparatus and an audio recording apparatus comprising:
   said image pickup apparatus being adapted to pick up video data for a still image;
   said audio recording apparatus receiving audible sound and recording corresponding audio data;
   a medium adapted to store said video data and audio data;
   a recording apparatus associated with said medium for recording video and audio data on said medium;
   a wireless remote controller for producing and emitting a wireless remote control signal including a first component representative of an image pickup demand and a second component representative of an audio recording demand, said wireless remote controller emitting said first component and second component of said wireless control signal at mutually adjustable independent timings, said remote controller comprising a first switch means for producing said remote control signal containing said first component when actuated, and a second switch means for producing said remote control signal containing said second component when actuated, said independent timings being preset when initiating said first or said second switch means;
   a remote control sensor for receiving said remote control signal emitted from said remote controller;
   a remote control detector connected with said remote control sensor for detecting said first and second components;
   first means associated with said image pickup apparatus and responsive to said first component of said remote control signal detected by said detector for ordering said image pickup apparatus to pick up video data; and second means associated with said audio recording apparatus and responsive to said second component of said remote control signal detected by said detector for ordering said audio recording apparatus to record audio data.

5. The combination of an image pickup apparatus and an audio recording apparatus comprising: said image pickup apparatus being adapted to pick up one field of video data for a still image;

said audio recording apparatus receiving audible sound and recording corresponding audio data;

a medium adapted to store said video data and audio data;

a recording apparatus associated with said medium for recording video and audio data on said medium;

a wireless remote controller for producing and emitting a wireless remote control signal including a first component representative of an image pickup demand and a second component representative of an audio recording demand, said wireless remote controller emitting said first component and said second component of said wireless control signal at mutually adjustable independent timings, said remote controller comprising a first switch means for producing said remote control signal containing said first component when actuated, and a second switch means for producing said remote control signal containing said second component when actuated, wherein one of said first and second switch means is manually operable and the other of said first and second switch means is automatically operable at a preset timing after manual operation of said one of first and second switch means;

a remote control sensor for receiving said remote control signal emitted from said remote controller;

a remote control detector connected with said remote control sensor for detecting said first and second components;

first means associated with said image pickup apparatus and responsive to said first component of said remote control signal detected by said detector for ordering said image pickup apparatus to pick up video data; and second means associated with audio recording apparatus and responsive to said second component of said remote control signal detected by said detector for ordering said audio recording apparatus to record audio data.

6. The combination as set forth in claim 5, wherein said preset time is variable.

7. The combination as set forth in claim 6, wherein said remote controller comprises a timing setting means allowing manual adjustment of said preset time.

8. The combination as set forth in claim 5, said recording apparatus being a recording and reproduction apparatus, wherein said image pickup apparatus includes a first memory for temporarily storing said video data and transferring said data to said recording and reproduction apparatus for recording said video data on said medium at a first transfer timing, and said audio recording apparatus includes a second memory for temporarily storing said audio data and transferring said audio data to said recording and reproduction apparatus for recording said audio data on said medium at a second transfer timing.

9. The combination as set forth in claim 8, wherein said image pickup apparatus includes a shutter and said first memory comprises photo-sensitive elements, and said shutter becomes operative in response to said first component of said remote control signal for controlling exposure of said first memory, thereby causing said first memory to pick up and store video data.

10. The combination as set forth in claim 8, wherein said audio recording apparatus includes a microphone for receiving audible sound, means for converting the output of said microphone into a pulse-code-modulated signal and said second memory comprising a digital memory, and said second memory being responsive to said second component of said remote control signal for recording said pulse-code-modulated signal for a predetermined period of time.

11. The combination as set forth in claim 8, wherein said image pickup apparatus includes a shutter and said first memory comprises photo-sensitive elements, and said shutter becomes operative in response to said first component of said remote control signal for controlling exposure of said first memory thereby causing said first memory to pick up and store video data, and said audio recording apparatus includes a microphone for receiving audible sound, means for converting the output of said microphone into a pulse-code-modulated signal and said second memory comprising a digital memory, and said second memory being responsive to said second component of said remote control signal for recording said pulse-code-modulated signal for a predetermined period of time.

12. The combination as set forth in claim 11, wherein said medium comprises a magnetic disc and said recording and reproduction apparatus comprises a disk drive accommodating said magnetic disk, said disk drive including an electric motor for driving said magnetic disk to rotate, which electric motor is driven in response to said first component of said remote control signal prior to operation of said shutter.

13. The combination as set forth in claim 12, wherein said shutter is operated to expose said first memory after a given delay time after said first component of said remote control signal, which delay time is long enough to allow said electric motor to attain a proper operating speed after starting to rotate.

14. The combination as set forth in claim 12, wherein said first and second means is responsive to termination of exposure of said first memory by said shutter to record said video and audio data on said magnetic disk.

15. The combination as set forth in claim 14, wherein said second means is disabled while said second memory is receiving said pulse-code-modulated signal.

16. The combination as set forth in claim 15, wherein said second memory is adapted to record said pulse-code-modulated signal in the form of a compressed-time-base pulse-code-modulated signal.

17. The combination as set forth in claim 15, wherein said first memory comprises a charge transfer device.

18. The combination as set forth in claim 15, wherein said remote controlled comprises a radio control unit.

19. The combination as set forth in claim 18, wherein said radio control unit is adapted to transmit infrared rays as said remote control signal.

20. An electronic still camera for recording video data and audio data on a recording medium, comprising:

an image pickup means for picking up a still image of an object and producing said video data, which image pickup means is responsive to a video pickup command for performing an image pickup operation;

an audio recording means for recording said audio data, which audio recording means is responsive to an audio recording command for performing an audio recording operation;

means, associated with said image pickup means and said audio recording means and operable in synchronism with operations of said image pickup means and said audio recording means, for recording said video data and said audio data on said recording medium; and a remote control commander including at least a first manually operable switch for producing each said video recording command and said audio recording command in response to manual operation thereof, said remote control commander having means for presetting, prior to operating said first manually operable switch, the time interval between said producing of said video and audio recording commands for initiating said operations of said image pickup means and said audio recording means and the time order of said video and audio recording commands, wherein upon actuation of said first manually operable switch both said video and audio recording commands are produced in the set order with the set time interval.

21. An electronic still camera with an audio recording feature, comprising:

an image pickup means for picking up video data;

an audio recording means for receiving audio data;

a magnetic disk drive mechanism for storing said video data and said audio data on a magnetic disk;

a remote controller means for remotely controlling said image pickup means to pick up video data and said audio recording means to record audio data at a given timing; and, said remote controller means comprising a first switch means for producing a first remote control signal representative of an image pickup demand; and, a second switch means for producing a second remote control signal representative of an audio recording demand;

one of said first and second switch means being manually operable and the other of said first and second switch means being automatically operable at a preset timing after manual operation of said one of first and second switch means.

* * * * *